United States Patent

[11] 3,609,731

| [72] | Inventor | Joseph H. Evans<br>Palo Alto, Calif. |
| [21] | Appl. No. | 752,881 |
| [22] | Filed | Aug. 15, 1968 |
| [45] | Patented | Sept. 28, 1971 |
| [73] | Assignee | Raychem Corporation<br>Menlo Park, Calif. |

[54] REVERTIBLE TEMPERATURE DETECTOR
7 Claims, 2 Drawing Figs.

[52] U.S. Cl. .................................................... 340/227 C,
    73/67.1, 73/358, 73/339 A
[51] Int. Cl. ...................................................... G08b 21/00,
    G01k 11/06
[50] Field of Search ............................................ 340/227 R,
    227.1, 232, 228 R, 227 C; 136/208, 222; 73/362,
    342, 69, 67.1, 339 A, 358

[56]         References Cited
         UNITED STATES PATENTS
3,487,690   1/1970   Bell et al. ....................... 73/339 A
2,922,147   1/1960   Bredesen ........................ 340/227.1
3,122,728   2/1964   Lindberg, Jr. ................... 340/229
                FOREIGN PATENTS
1,035,763   7/1966   Great Britain .................. 73/339 A
                OTHER REFERENCES Johnson, " Measurement of Wire Temperature" Western Electric Tech. Digest No. 10 April, 1968 - copy in 73-339 A Product Engineering, Vol. 34 No. 15 page 35, July 22, 1963 Copy in 73-339 A

*Primary Examiner*—Robert L. Richardson
*Attorney*—Lyon & Lyon

ABSTRACT: A rapid, sensitive, revertible temperature monitoring system using a substantial change in impedance of a medium to a signal at a temperature-dependent change of physical condition, e.g., a change of state. In particular a system in which the transmission of ultrasonic waves through a meltable wire is monitored to indicate the temperature of the environment.

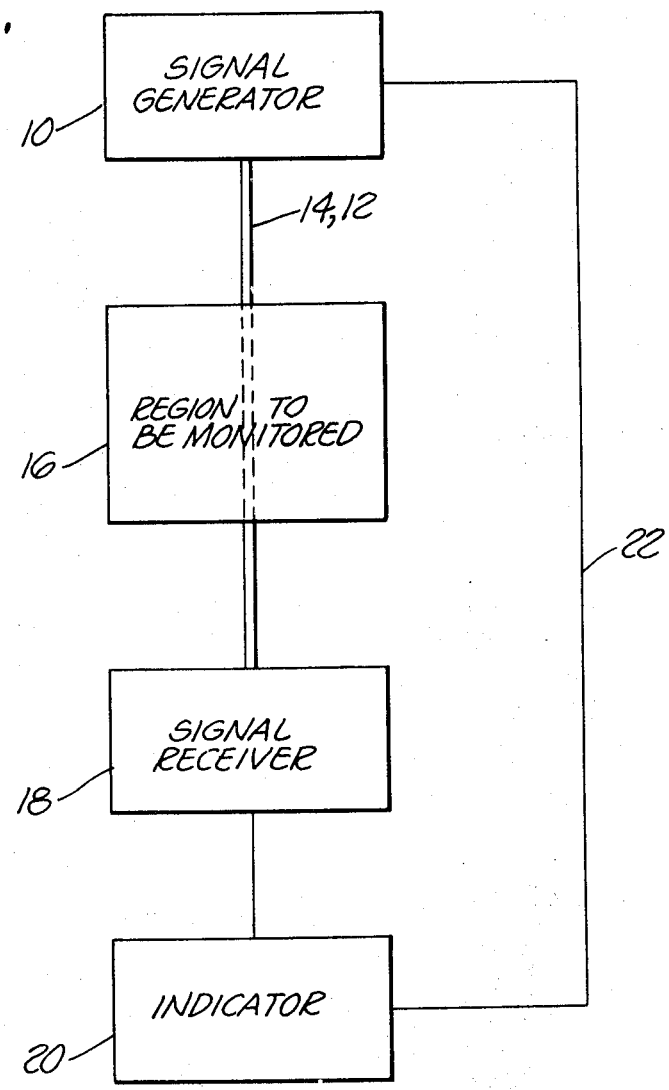
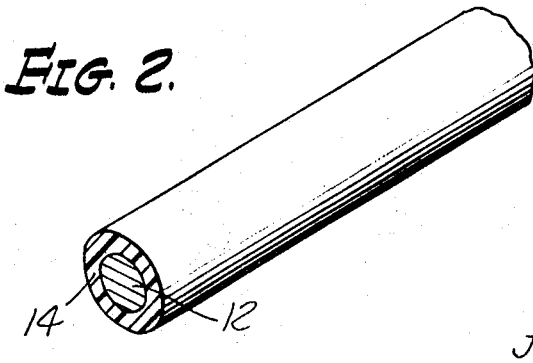

REVERTIBLE TEMPERATURE DETECTOR

BACKGROUND OF THE INVENTION

It is frequently necessary to monitor the temperature of a region to give an indication when the temperature rises above or falls below a certain level. Thermocouples and similar temperature detectors have been used in the past, but they suffer from the disadvantage that each detector can only monitor the temperature at a single point. When a large region is involved, it has been necessary to have a large number of detectors, each with its own associated circuitry, which makes the system heavy and expensive. In many applications, for example in aircraft, it is necessary to monitor the temperature along the length of a hot air duct to give an early warning of any malfunction, for example duct leakage, but at the same time, the weight of the monitoring system must be kept as low as possible. It is also necessary that the monitoring system should be capable of returning to its normal state when the temperature returns to normal, and it should indicate that the temperature has returned to normal. Further, the system should respond rapidly to temperature changes, and give a clear indication when a critical temperature is reached.

SUMMARY OF THE INVENTION

The present invention provides a temperature monitoring system comprising a signal generator, a signal receiver, a medium which is capable of transmitting the signal from the generator to the receiver, the impedance of the medium to the signal exhibiting a substantial change with temperature at a given temperature or within a given temperature range, and means for indicating a substantial change in the strength of the signal obtained by the receiver. As used herein, the term signal includes any form of transmission, whether continuous or intermittent, of energy or force. Preferably, the signal is an ultrasonic wave, and the medium is one which will carry the wave up to but not above a certain temperature, for example the melting point of the medium. The medium may be, for example, in the form of a wire of a suitable melting point, enclosed within a tube which is elastomeric at least at the melting point of the wire, so that any volume change which takes place on melting can be accommodated, the tube confining the wire to insure continuity when the temperature falls below the melting point of the wire. One end of the wire is connected to an ultrasonic wave generator, the other end to an ultrasonic receiver, the wire being lead through the region of which the temperature is to be monitored.

BRIEF DESCRIPTION OF THE DRAWINGS

FIG. 1 is a block diagram of a temperature monitoring system according to the present invention.

FIG. 2 is a perspective view of a portion of a signal carrier of the present invention.

DESCRIPTION OF THE INVENTION

FIG. 1 illustrates schematically one embodiment of the temperature monitoring system according to the invention. A signal generator, diagrammatically represented at 10, is an ultrasonic wave generator of any type, for example a crystal transducer, operating at any suitable frequency, e.g., in the range of 20 to 200 kc., to which is connected a solder wire 12 covered by a polymeric jacket 14 as is more clearly shown in FIG. 2. The wire 12 passes through the region to be monitored, represented at 16, its path through he region being selected so as to monitor it effectively. The end of the wire 12 remote from the generator 10 is connected to a suitable receiver 18, which may also be a crystal transducer. The receiver 18 is in turn connected to an indicator 20 which is arranged to give a suitable warning indication if the signal received by the receiver 18 is changed by a predetermined quantity. Optionally, a comparison signal is fed along a line 22 to the indicator, so that indication of malfunction of the generator can also be given to eliminate spurious alarms.

It will be appreciated that in the specific embodiment herein described, ultrasonic waves may be transmitted through the solder wire in the solid state either in the form of longitudinal waves or in the form of shear or transverse waves. Desirably, however, transmission is arranged to be predominantly in the shear or transverse mode, by suitable coupling of the generator to the wire or suitable mounting of the generator since transverse waves are most greatly attenuated by suitable coupling of the generator to the wire or suitable mounting of the generator since transverse waves are most greatly attenuated by passage through a liquid. In this manner, the greatest drop in signal strength at the receiver when the solder is melted can be achieved.

The type of wire will, of course, be dictated by the temperature at which the system is designed to operate. For example, a solder containing 63 percent Sn, 37 percent Pb will melt at 185° C., and is therefore suitable for use at this temperature. It will be appreciated that it is necessary to jacket the solder in a tube of suitable diameter and physical characteristics which will in turn depend on the temperature at which the system is to be operative. The tube should be sufficiently elastomeric at the melting temperature of the wire, and of a diameter such that it will constrain the molten material so that, when the temperature falls to allow it to solidify, it will remain in or return to the form of a continuous wire. The tube should, of course, be of a 5 material which will not transmit ultrasonic waves at a temperature at which the wire itself does not transmit waves, nor of a material which is attacked by the material of the wire when molten or deleteriously affected by the temperatures at which the system is to operate. Examples of materials suitable for use in the invention are cross-linked crystalline thermoplastics which are elastomeric at least above their crystalline melting temperatures, for example, cross-linked polyolefines, e.g., polyethylene, polyvinylidene fluoride, and, in general, those materials suitable for use in the Cook, et at., process described in U.S. Pat. No. 3,086,242, the disclosure of which is incorporated by reference herein.

Conveniently, the wire is encapsulated in the tubing by inserting the wire in heat-shrinkable tubing and shrinking the tubing over the wire. Advantageously, the tubing has the property of elastic memory, for example, that produced by the process of Cook, et al., U.S. Pat. No. 3,086,242.

The tubing should preferably be such that its recovered internal diameter is slightly less than the outside diameter of the wire (e.g. 5 percent to 25 percent less) and advantageously its recovery temperature is slightly below the melting point of the wire.

It will be noted that the transmitting medium and its encapsulation can both be very light in weight, an important feature in itself for aviation applications, which also results in a good temperature response since the thermal capacity of the system can consequently be made small, resulting in good temperature sensitivity.

In some circumstances, the region to be monitored is greater than a simple single system can efficiently monitor. If such is the case, the system may have one or more signal generators, a plurality of signal transmitting media and a plurality of receivers which may operate on or more indicators as desired. Alternatively or additionally, a single generator and receiver may be connected for a part of the distance between them by a medium which will transmit the signal at temperatures above and below the operating temperature of the system, the remainder of the connection being made by the "indicating" medium. For example, lengths of copper wire may be interspersed between lengths of solder wire (melting at 185° C.) for a system which has an indicating temperature of 185° C.

In a test of a system constructed in accordance with the present invention, a solder wire of 0.0625 inch nominal outside diameter and a melting point of 185° C. (63 percent Sn, 37 percent Pb) was placed in cross-linked polyethylene heat-shrinkable tubing which was shrunk onto the solder to encapsulate it. Thirty inches of the covered wire were connected between a 25 kc. ultrasonic generator and a crystal transducer tuned to receive the signal. The output from the transducer was fed to an oscilloscope.

While the wire was at room temperature, the oscilloscope displayed a sine wave of amplitude 2.3 cm. A section of the solder wire was then heated and the amplitude of the display wave dropped suddenly after a few seconds heating to about 0.2 cm.—i.e., little more than the thickness of the trace. The heat source was removed, and 5 seconds afterward the wave amplitude increased suddenly to 2.2 cm. This cycle was repeated twice, showing that a sensitive, revertible system having a sharp indicating temperature is provided by the present invention.

The present embodiments are therefore to be considered in all respects as illustrative and not restrictive, the scope of the invention being indicated by the appended claims rather than by the foregoing description, and all changes which come within the immediate range of equivalency of the claims are therefore intended embraced therein.

1. A temperature monitoring system comprising a signal generator, a signal receiver, a meltable solid medium capable of transmitting a signal from said generator to said receiver, said medium exhibiting a substantial change in impedance to said signal at a given temperature, and means for indicating a substantial change in the strength of the signal received by said receiver, the impedance to said signal changing substantially at the melting point of said solid, said system also comprising means for maintaining continuity of said medium while said medium is liquid.

2. A temperature monitoring system as claimed in claim 1 wherein said meltable solid is solder wire.

3. A temperature monitoring system as claimed in claim 2 where said continuity maintaining means comprises a plastic tube which is elastomeric at the melting temperature of said solder wire.

4. A temperature monitoring device comprising an ultrasonic wave generator, a receiver for ultrasonic waves, means for indicating when said receiver is receiving ultrasonic waves, and a continuous medium connecting said generator and said receiver, said medium exhibiting a substantial change in its impedance to ultrasonic waves at a given surrounding temperature and said medium comprising a meltable solid, the impedance of which to ultrasonic waves increases substantially at its melting temperature, said system also comprising means for maintaining the continuity of the medium while in the liquid state.

5. A temperature monitoring device comprising an ultrasonic wave generator, a receiver for ultrasonic waves, means for indicating when said receiver is receiving ultrasonic waves, and a continuous medium connecting said generator and said receiver, said medium exhibiting a substantial change in its impedance to ultrasonic waves at a given surrounding temperature and said medium comprising a meltable wire incapsulated in a tube.

6. A temperature monitoring system as claimed in claim 5 wherein said wire is a solder wire.

7. A temperature monitoring system as claimed in claim 5 wherein said tube is a heat-shrinkable tube.